US012631945B2

(12) United States Patent
Harper

(10) Patent No.: US 12,631,945 B2
(45) Date of Patent: May 19, 2026

(54) QUICK RELEASE DEVICE AND SYSTEM

(71) Applicant: Random Tuesday Productions Inc.,
Delta (CA)

(72) Inventor: Jackson Harper, Delta (CA)

(73) Assignee: Random Tuesday Productions Inc.,
Delta (CA)

( * ) Notice: Subject to any disclaimer, the term of this
patent is extended or adjusted under 35
U.S.C. 154(b) by 95 days.

(21) Appl. No.: 18/508,969

(22) Filed: Nov. 14, 2023

(65) Prior Publication Data

US 2024/0160091 A1 May 16, 2024

Related U.S. Application Data

(60) Provisional application No. 63/425,382, filed on Nov.
15, 2022.

(51) Int. Cl.
*G03B 17/56* (2021.01)
*F16M 11/04* (2006.01)
(52) U.S. Cl.
CPC ......... *G03B 17/561* (2013.01); *F16M 11/041*
(2013.01)
(58) Field of Classification Search
CPC ......... F16M 11/041; G03B 17/56–566; F41G
11/003
See application file for complete search history.

(56) References Cited

U.S. PATENT DOCUMENTS

| | | | |
|---|---|---|---|
| 3,356,325 | A | 12/1967 | Schnase |
| 4,057,816 | A | 11/1977 | Killian |
| 5,983,467 | A | 11/1999 | Duffy |

(Continued)

FOREIGN PATENT DOCUMENTS

| | | | |
|---|---|---|---|
| DE | 102018115527 | A1 | 1/2019 |
| WO | 2012160123 | A1 | 11/2012 |

OTHER PUBLICATIONS

Zacuto "Tactical Handle" https://zacuto.com/products/tactical-handle, archive.org copy dated May 2021 (Year: 2021).*

(Continued)

*Primary Examiner* — Leon W Rhodes, Jr.
(74) *Attorney, Agent, or Firm* — Perpetual Motion Patents
Ltd.

(57) ABSTRACT

A quick release system including a quick release device
which includes an elongated body. The body includes a
dovetail sitting proud of a first side of the body, widening
towards a first end of the body, and including a first undercut
lip. The body further includes a tail-socket defined shy of the
first side, widening towards a second end of the elongated
body, and including a second undercut lip. The body further
includes a detent interrupting the second lip proximate to a
first edge of the body, a first void defined in the body from
the first edge and underlying the dovetail, and a second void
defined in the body interrupting the first lip and in connec-
tion with the first void. The quick release device further
includes a pin in free fit within the second void, a spring
biasing the pin towards the first edge and outside of the
uninterrupted periphery of the first lip, and a button in the
first void coupled to the spring and to the pin. The button in
response to an inwardly applied force moves the pin inside
the uninterrupted periphery of the first lip.

9 Claims, 8 Drawing Sheets

(56)            References Cited

U.S. PATENT DOCUMENTS

| | | | | |
|---|---|---|---|---|
| 6,196,504 | B1 | 3/2001 | Lemke | |
| 6,773,172 | B1 | 8/2004 | Johnson | |
| 7,431,531 | B2 | 10/2008 | Carnevali | |
| 7,864,244 | B2 * | 1/2011 | Desorbo | H04N 23/50 |
| | | | | 396/419 |
| 9,188,274 | B2 | 11/2015 | Schorman | |
| 9,568,282 | B1 * | 2/2017 | Schorman | G03B 17/561 |
| 10,180,153 | B2 | 1/2019 | Burns | |
| 10,976,000 | B2 | 4/2021 | Johnson | |
| 2011/0167703 | A1 * | 7/2011 | Deros | F41G 11/003 |
| | | | | 42/90 |

OTHER PUBLICATIONS

"LNKcine LNK Quick-Release for Camera Accessories—A Genderless, Smart, and Secure System", at <https://www.cined.com/lnkcine-lnk-quick-release-for-camera-accessories-a-genderless-smart-and-secure-system/> dated Feb. 2024 (Year: 2024).*

16X9 Inc. "Cine Lock" available from 16 X 9, Inc., Valencia, CA, US, URL: https://16x9inc.com/16x9-inc-cine-lock.html.
Kondor Blue "Mini Lock Quick Release Plates for Professional Camera Workflows: KB-ML" available from Kondor Blue, LLC, Ontario, CA, US, URL: https://kondorblue.com/collections/baseplates/products/new-mini-quick-release-plate.
Kondor Blue, "Mini V-Mount Battery Plate: KB-MVP" available from Kondor Blue, LLC, Ontario, CA, US, URL: https://kondorblue.com/collections/power-supply/products/mini-v-mount-battery-plate.
SmallRig "S-Lock Quick Release Mounting Device" available from SmallRig, Shenzhen, GD, CN, URL: https://www.smallrig.com/smallrig-s-lock-quick-release-mounting-device-1855.html.
SmallRig "Mini V-Lock Assembly Kit MD2801B" available from SmallRig, Shenzhen, GD, CN, URL: https://www.smallrig.com/smallrig-mini-v-lock-assembly-kit-md2801.html.
Van Dusen, Walter, 2023 "The Best Quick Releases 2023 : LNK Quick Release | 16x9 Cine Lock | Kondor Blue Mini QR Plate" YouTube Video, published Oct. 30, 2023, https://www.youtube.com/watch?v=AQXXpNBbwUk.

* cited by examiner

QUICK RELEASE DEVICE AND SYSTEM

TECHNICAL FIELD OF THE INVENTION

The present disclosure primarily relates to genderless connectors that help to join equipment together. This present disclosure includes a quick-release device and connector system.

BACKGROUND OF THE INVENTION

Cameras and other equipment used in film production (e.g., accessories, monitors, microphones, lighting) are connected to other structures such as a NOGA moveable arm, stand, or tripod, through suitable attachments like mounts. Typically, these attachments are unwieldy, very cumbersome involving several screws, bolts and nuts, and labour-intensive to use. Quite often, it takes a long time to attach or remove these camera accessories.

Thus, there is a need to develop a mount with a locking system that is universal and can be readily used to attach suitable accessories quickly without too much effort. Exemplary attachments include the CINE LOCK and WEDGIE quick releases. However, these examples are gendered or keyed such that parts are not interchangeable.

SUMMARY OF THE INVENTION

A quick release device including an elongated body which includes a dovetail sitting proud of a first side of the elongated body. The dovetail widens towards a first end of the elongated body, and the dovetail includes a first undercut lip. The elongated body further includes a socket defined shy of the first side. The socket widens towards a second end of the elongated body, and the socket includes a second undercut lip. The elongated body further includes a detent defined in the elongated body and interrupting the second undercut lip proximate to a first edge of the elongated body, a first void defined in the elongated body from the first edge and underlying the dovetail, and a second void defined in the elongated body interrupting the first undercut lip and in connection with the first void. The quick release device further includes a pin in free fit within the second void, a spring biasing the pin towards the first edge and outside of the uninterrupted periphery of the first undercut lip, and a button in the first void coupled to the spring and to the pin. The button in response to an inwardly applied force moves the pin inside the uninterrupted periphery of the first undercut lip.

A kit including a quick release device as described above, an elongated body as described above, a low-profile camera screw, a threaded adapter, and a least one anti-twist body.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

FIG. 1 to FIG. 8 include technical illustrations of a quick release, for example, a quick release, half a quick release, quick release device, or a quick release system, in accordance with various aspects of the present invention. Generally, herein, unless the context dictates otherwise, quick release device refers to half a quick release, while a quick release system refers to either a pair of quick release devices, or one quick release device and a matching body. Generally half and halves refer to a quick release device.

Figure 1:
FIG. 1 illustrates, in a first perspective view and exploded view, a first half of a quick release in accordance with various aspects of the invention.
Figure 2:
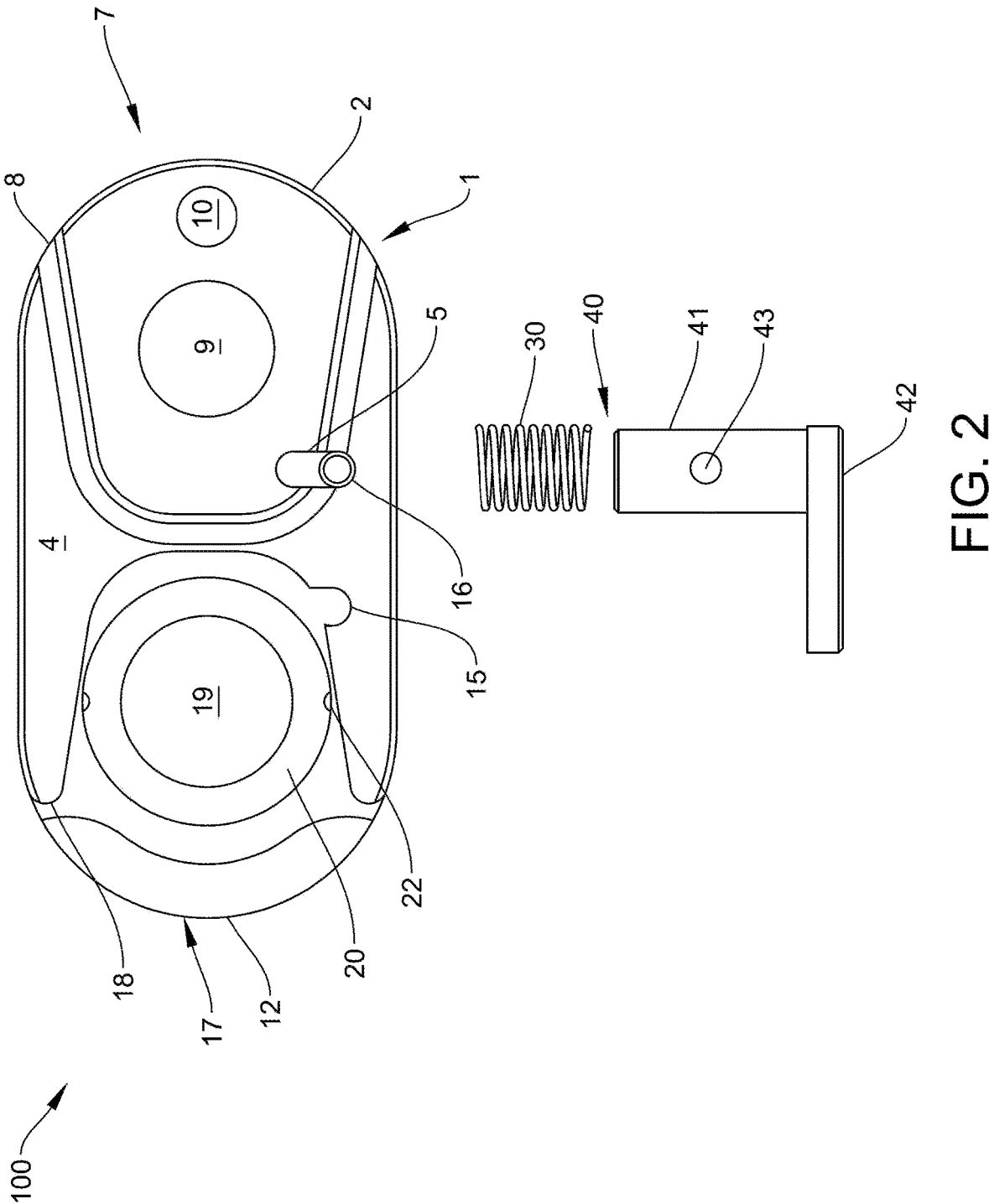
FIG. 2 illustrates, in a plan view, the exploded quick release device shown in FIG. 1.
Figure 3:
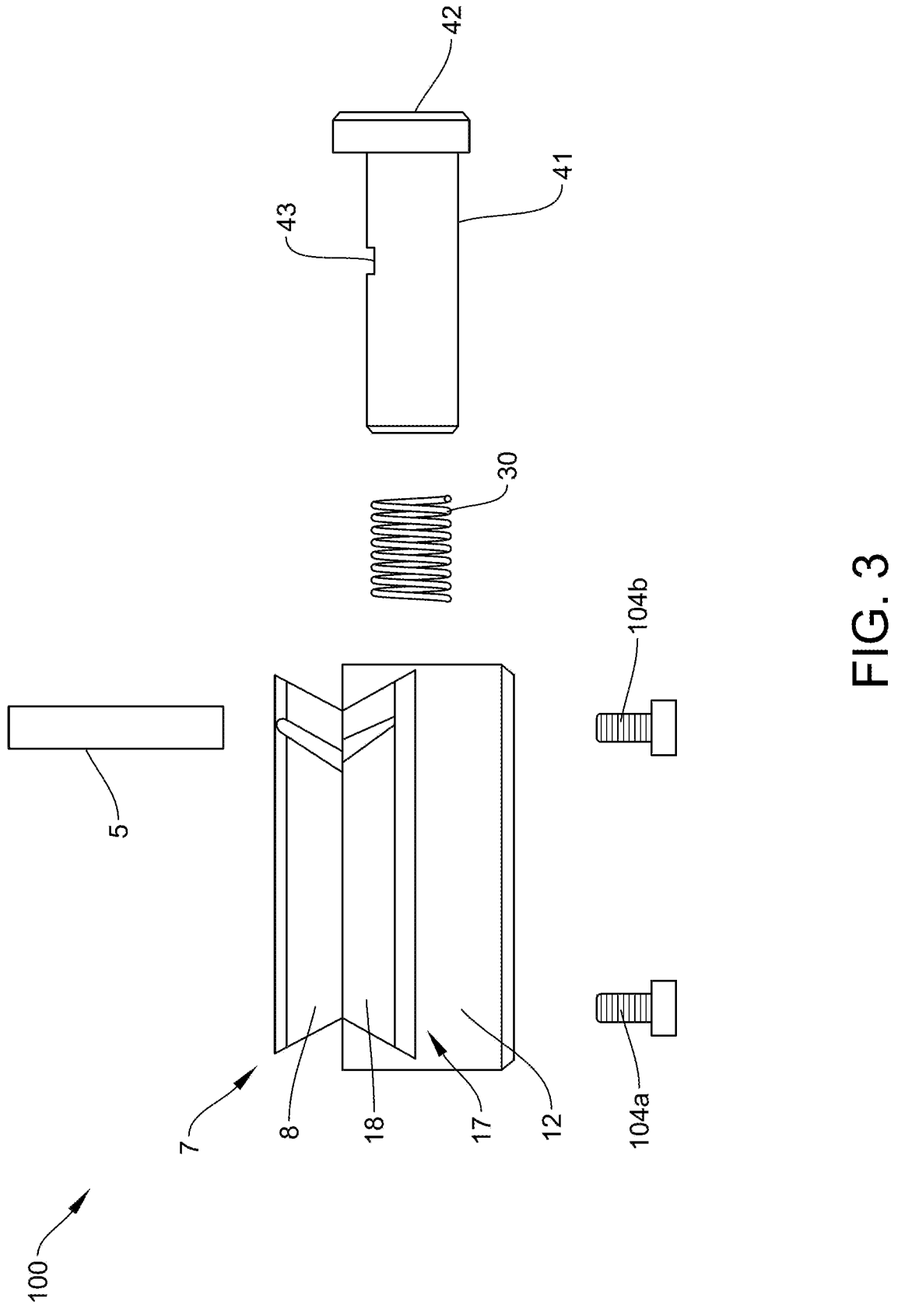
FIG. 3 illustrates, in an elevation view of an end, the exploded quick release device shown in FIG. 1.
Figure 4:
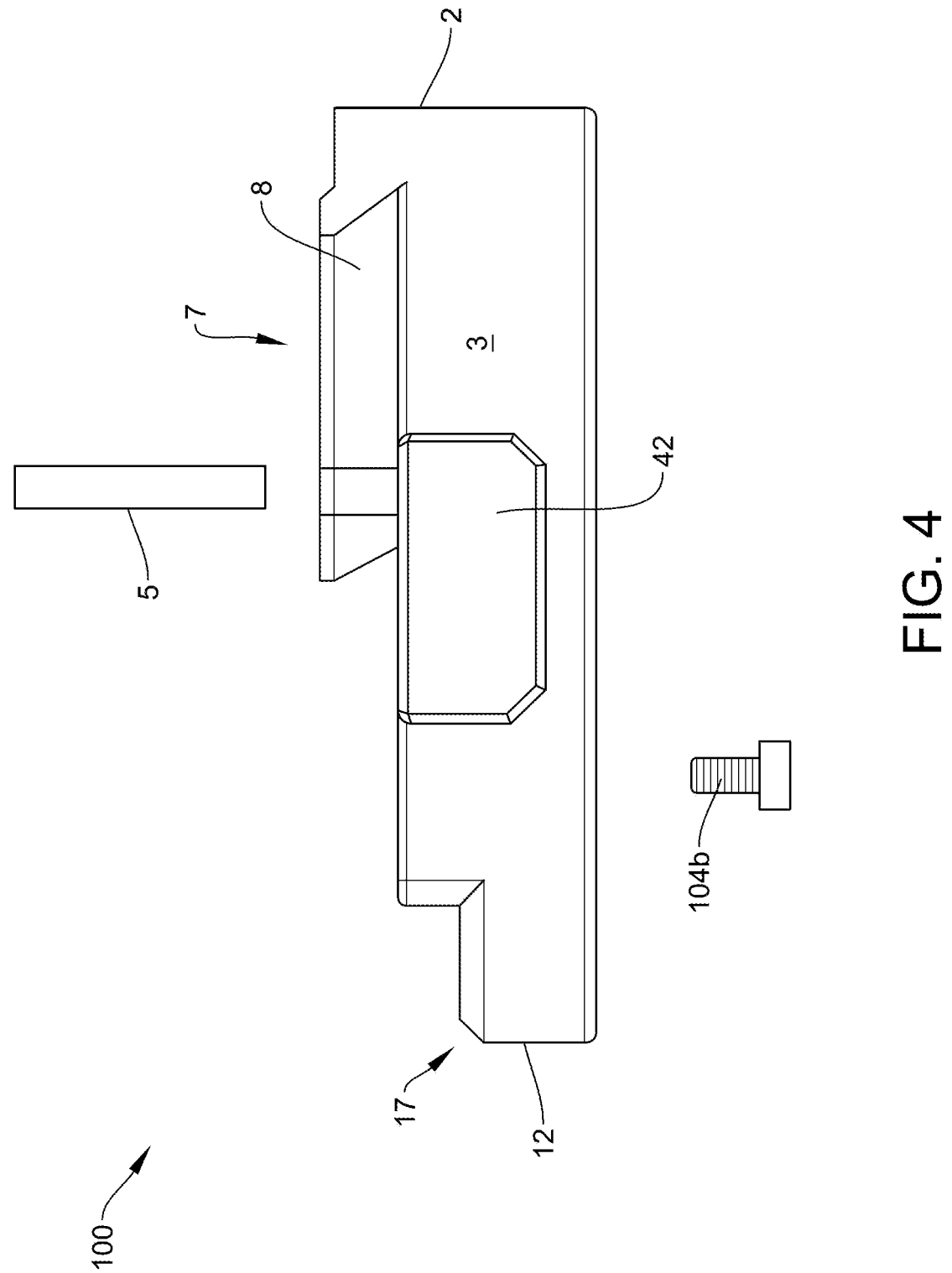
FIG. 4 illustrates, in an elevation view of an edge, the exploded quick release device shown in FIG. 1.
Figure 5:
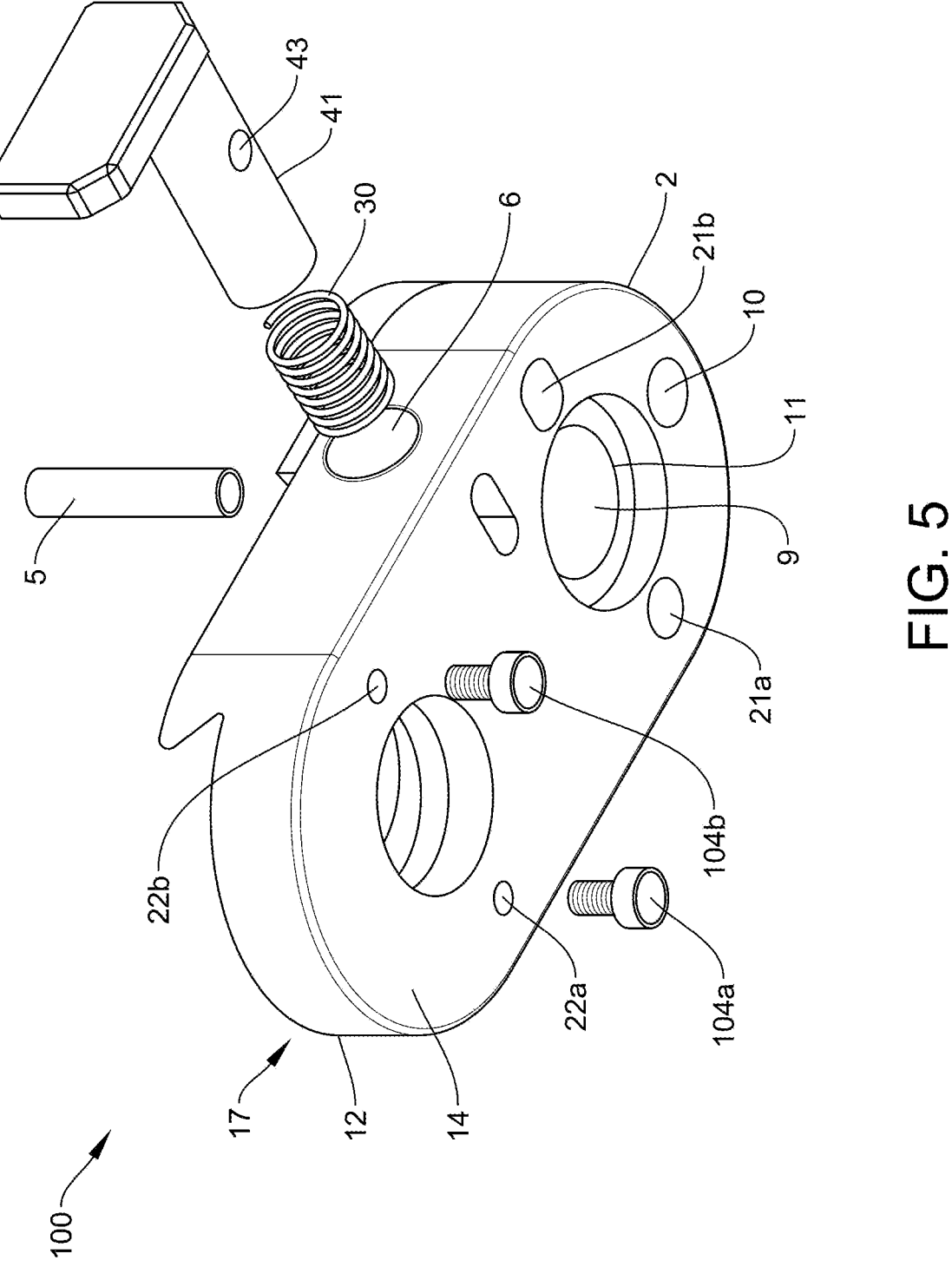
FIG. 5 illustrates, in perspective view, the exploded quick release device shown in FIG. 1.
Figure 6:
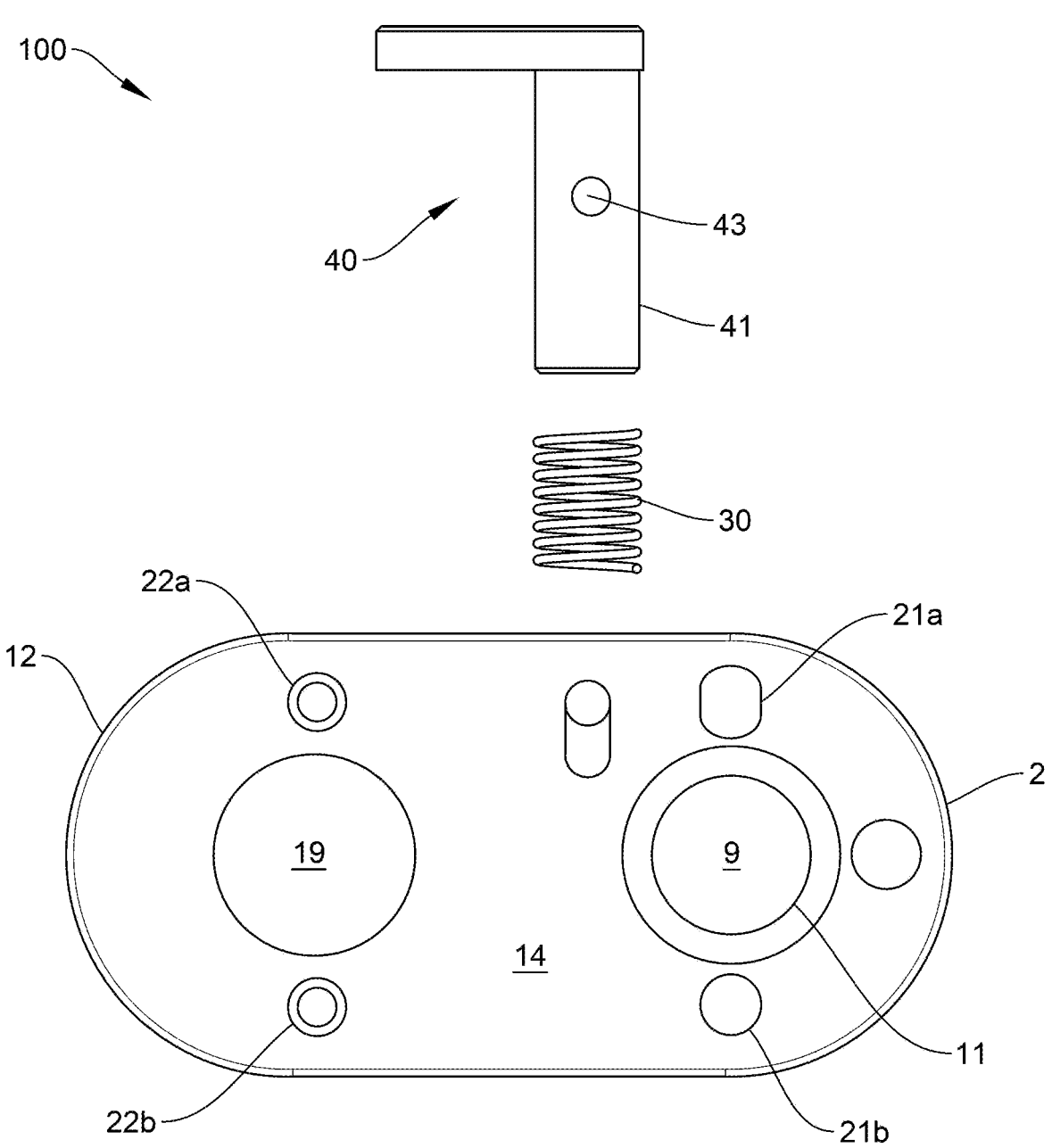
FIG. 6 illustrates, in plan view, the exploded quick release device shown in FIG. 1.

FIG. 1 to FIG. 6 illustrate a half of a quick release, or quick release device, in various views. FIG. 1 illustrates a first perspective view of the quick release device. More particularly, the quick release is shown in an exploded view and the first perspective view includes a first side. FIG. 2 illustrates in a plan view the first side of the exploded quick release device shown in FIG. 1. FIG. 3 illustrates in elevation view an end of the exploded quick release device shown in the preceding drawings. FIG. 4 illustrates in elevation view an edge of the exploded quick release device shown in the preceding drawings. FIG. 5 illustrates a second perspective view of the exploded quick release device shown in the preceding drawings. More particularly the second perspective view is of a second side of the quick release. FIG. 6 illustrates, in plan view, the second side of the exploded quick release device shown in the proceeding drawings.

Figure 7:
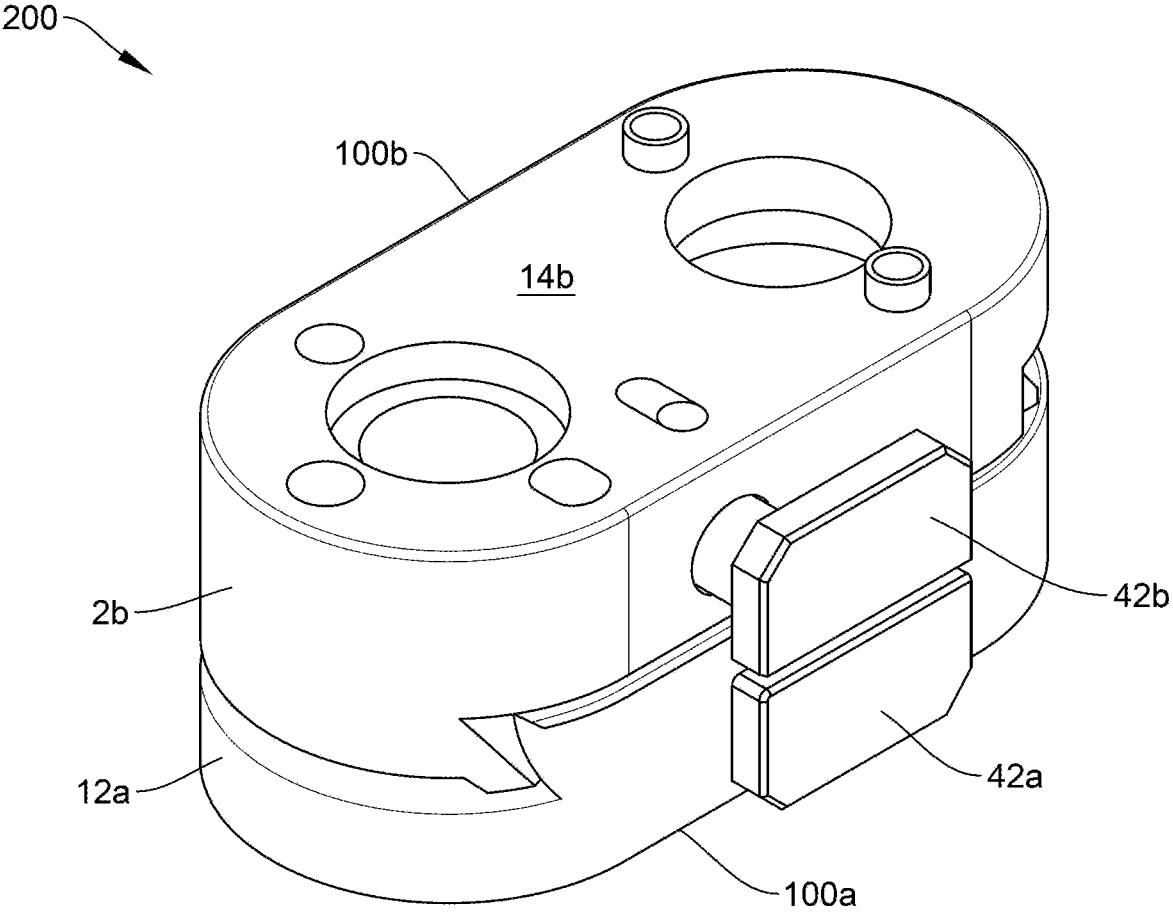
FIG. 7 illustrates, in perspective view, the quick release device shown in FIG. 1 and at least one part of a second quick release device in accordance with various aspects of the invention.

FIG. 7 illustrates a first quick release device and a second quick release device coupled together in a perspective view like the view of FIG. 1. In some embodiments, the first half and the second half are congruent parts. The dovetails and the tail sockets mesh.

Figure 8:
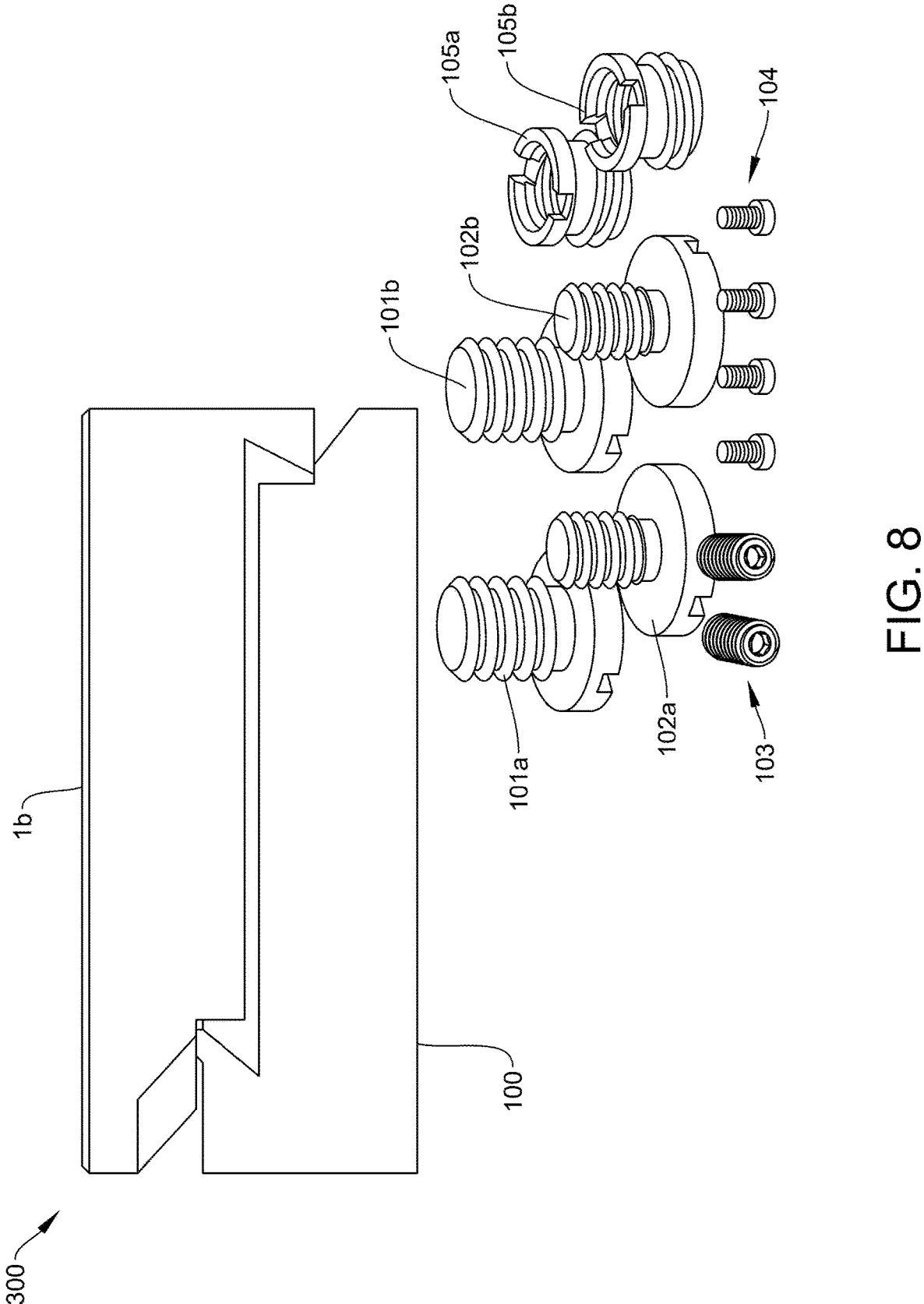
FIG. 8 illustrates, in perspective view, a kit including the quick release device shown in FIG. 1 and other parts.

FIG. 8 illustrates, in perspective view, a kit including the quick release device shown in FIG. 1 and other parts.

FIG. 1 illustrates a quick release device 100 including an elongated body 1. The elongated body 1 includes a first end 2, a second end 12, a first edge 3, a second edge 13, a first side 4, and a second side 14. The first side 4 can be conventionally called the top. A correspondingly helpful convention is to label first end 2 as the back. Elongated body 1 includes a dovetail 7 sitting proud of first side 4. For example, dovetail 7 is raised above first side 4. In some embodiments, dovetail 7 flares or widens in shape in the plane of first side 4 in the direction of first end 2. In some embodiments, dovetail 7 is defined by an outer periphery that includes a first lip 8. In some embodiments, lip 8 is an undercut lip overhanging a portion of first side 4.

In some embodiments, elongated body 1 includes a tail-socket or socket 17 sitting below or shy of first side 4 and widens towards second end 12. In some embodiments, socket 17 includes, e.g., is defined in part by, a second lip 18 that corresponds in profile to first lip 8. In some embodiments, second lip 18 undercuts a portion of first side 4. In some embodiments, elongated body 1 includes a detent 15 defined in elongated body 1 and interrupting second lip 18. Detent 15 may be proximate to first edge 3 of the elongated body 1. Detent 15 has a first position relative to the major axis of elongated body 1 and a second position relative to the apex of socket 17.

In some embodiments, elongated body 1 includes a first void 6 defined in elongated body 1 extending from the first edge 3 and underlying dovetail 7. In some embodiments, the principal axis of first void 6 has one more of the following geometric attributes: coplanar with first side 4, parallel with the minor axis of elongated body 1, or perpendicular to first edge 3. In some embodiments, such as shown, first void 6 has a circular cross-section.

In some embodiments, elongated body 1 includes a second void 16 defined in elongated body 1 interrupting first lip 8 and in connection with first void 6. Second void 16 is in a corresponding position to detent 15. In some embodiments, second void 16 is proximate to first edge 3. Second void 16 has a third position relative to the major axis of elongated body 1 approximately equal to the first position of detent 15. Second void 16 has a fourth position relative to the apex of dovetail 7 corresponding to the position of detent 15 relative to the apex of socket 17. In some embodiments, such as shown, second void 16 has a pill or stadium cross-section.

As shown in FIG. 1, quick release device 100 includes a pin 5 in free fit within second void 16, a spring 30 biasing pin 5 towards the first edge 3, and a button 40 in the first void 6. Pin 5 may be a rod, dowel, or other body with and without rotational symmetry.

In some embodiments, button 40 includes a post 41, and a face 42. In some embodiments pin 5 in is free fit within second void 16 and coupled to spring 30 biasing pin 5 towards the first edge 3 and outside of the uninterrupted periphery of first lip 8. In some embodiments, post 41 includes a hole 43 to receive pin 5 in an interference fit. For example, pin 5 is in free fit within second void 16 and in an interference fit with hole 43. In operation, a user presses on face 42, in response spring 30 yields, and pin 5 moves in second void 16. For example, in response to an inwardly applied force on button 40, pin 5 moves inside the uninterrupted periphery of the first lip 8. That is in response to an applied force the pin moves to a medial position in elongated body 1.

Dovetail 7 and socket 17 are in corresponding shape to each other. When a first half of quick release 100 is paired with a second half of quick release 100 or another elongated body 1, the two articles operate cooperatively. In some embodiments, first half of quick release 100 is detachably connected to a second elongated body including dovetail 7 which widens towards a first end of the second elongated body, and the dovetail includes a first lip 8. The second elongated body includes a socket 17 which widens towards a second end of the second elongated body, and socket 17 includes a second lip 18. The second elongated body includes a detent 15 defined in the second elongated body and interrupting the second lip 18.

In some embodiments, elongated body 1 and button 40 are made from aluminum. Spring 30 may be made of steel, plastic, or rubber. In some embodiments, pin 5 includes steel. In some embodiments, one or more of elongated body 1, button 40, and pin 5 include aluminum and the aluminum is coated in nickel. In some embodiments, one or more of elongated body 1, pin 5, and button 40 include aluminum and the aluminum is anodized.

The following dimensions are exemplary. Elongated body 1 may be 2:1 in length to width. For example, 44 mm in length and 22 mm in width excluding the button 40. From button face 42 to second edge 13 the width may be 26.5 mm. The height of half of quick release 100 from second side 14 to extreme of dovetail 7 is 13 mm. The combination of two halves of quick release 100 may be less than the sum of heights, for example, two halves of quick release 100 cooperatively paired may be 19 mm. In some embodiments pin 5 is a dowel with a 2 mm nominal diameter and 12 mm in length.

In some embodiments, elongated body 1 includes a third void or a first through hole 9 defined from the first side 4 to second side 14 of the elongated body 1. In some embodiments, first through hole 9 is defined in the dovetail 7. First through hole 9 may be threaded to allow facile connecting and disconnecting of attachments to elongated body 1. In some embodiments, the first through hole 9 is tapped or threaded as ⅜"-16. That is ⅜" diameter and 16 threads per inch or UNC Unified Coarse Thread. In some embodiments, the first through hole 9 is tapped or threaded as ¼"-20. For more information see standards documents DIN 4503-1 or ISO 1222. First through hole 9 may be fitted with a ⅜"-16 to ¼"-20 adapter.

In some embodiments, elongated body 1 includes a fourth void or a second through hole 19 defined from the first side 4 to second side 14 of the elongated body 1. In some embodiments, second through hole 19 is defined in the socket 17. In some embodiments, second through hole 19 is not threaded.

In some embodiments, elongated body 1 includes a counterbore or step 20 surrounding second through hole 19. Step 20 provides a purchase for the underside of a bolt which may be threaded into a piece of equipment, e.g., a tripod socket. In some embodiments, elongated body 1 includes a step surrounding first through hole 9 but is disposed on second side 14.

In some embodiments, elongated body 1 includes a fifth void or a third through hole 10 defined from first side 4. Third through hole 10 may be a blind hole or extend from first side 4 to second side 14 of the elongated body 1. In some embodiments, third through hole 10 is defined in the dovetail 7. In some embodiments, third through hole 10 is threaded or threaded in part.

FIG. 2 illustrates quick release device 100 in plan view of first side 4. Again, conventionally labelled top side for clarity. Half of a quick release 100 includes elongated body 1 which includes dovetail 7 which widens towards first end 2. Dovetail includes and is, in part, defined by first lip 8. Elongated body 1 includes socket 17 which widens towards second end 12 and is defined by second lip 18. Elongated body 1 includes a detent 15 defined and interrupting the second lip 18. Half of a quick release 100 includes a first void 6 in corresponding position to detent 15, pin 5 in free fit within first void 6. In operation pin 5 moves along the major axis of first void 6. In some embodiments, elongated body 1 includes first through hole 9 which may be located in the dovetail 7. In some embodiments, elongated body 1 includes second through hole 19 which may be located in the socket 17.

In some embodiments, quick release device 100 includes holes from second side 14 to step 20. For example, hole 22. A machine screw in hole 22 converts step 20 from providing a loose fit to an interference fit with a body in through hole 19 or near step 20.

In some embodiments, quick release device 100 includes elongated body 1, pin 5, spring 30, and button 40. In some embodiments, button 40 includes post 41, face 42, and hole 43.

FIG. 3 illustrates quick release device 100 in an elevation view of second end 12. Half of a quick release 100 includes elongated body 1 which includes dovetail 7 defined in part by first lip 8. First lip 8 may include an undercut. Elongated body 1 includes socket 17 defined by second lip 18. Elongated body 1 includes a detent 15 defined and interrupting the second lip 18.

Half of a quick release 100 includes spring 30, pin 5, and button 40. Also shown in FIG. 3 are screw 104a and screw 104b both described further herein.

FIG. 4 illustrates quick release device 100 in elevation view principally of first edge 3. The dovetail 7 and socket 17 are on the same side of elongated body 1. As shown the dovetail 7 and socket 17 are on the superior side. Button 40 is in a lateral position.

FIG. 5 illustrates quick release device 100 in perspective view including second side 14. The view in FIG. 5 could be labelled a bottom perspective view.

In some embodiments, quick release device 100 includes a plurality of inferior holes which may be blind or through, and tapped (threaded) or not. In some embodiments, quick release device 100 includes a first plurality of inferior holes 21, e.g., hole 21a and hole 21b. In some embodiments, one or more holes in the first plurality of inferior holes 21 are sized and tapped or threaded for M1.6. In operation, first plurality of inferior holes 21 may receive one or more of screw 104a or screw 104b. For example, an M1.6 machine screw with a socket cap which provides a protrusion proud of, and in this convention inferior to, second side 14. The one or more of screw 104a or screw 104b may resist shear or torque forces. When spaced apart 15 mm and in line with the center of second hole 19, machines screws in first plurality of holes 21 and sitting proud of second side 14 act as ARRI Anti Twist pins described herein.

In some embodiments, quick release device 100 includes a second plurality of inferior holes 22, e.g., hole 22a and hole 22b. One or more of second plurality of inferior holes 22 may be blind. In some embodiments, second plurality of inferior holes 21 are not tapped or threaded. Second plurality of inferior holes 21 may act as spotface holes to receive a bolt head or registration holes for a male counterpart. In some embodiments, second plurality of inferior holes 21 corresponds to the ARRI Anti Twist standard defined in ARRI Pin-Lock technical document from Arri AG of München, BY, DE. For example, second plurality of inferior holes 21 are aligned with center of hole 9, 15 mm center to center, 3 mm in diameter, and have a depth exceeding 4.8 mm.

In some embodiments, hole 10 is a through hole. In some embodiments, hole 10 is threaded or tapped for at least part of the distance from second side 14 to first side 4. Hole 10 may be machined for 8-32 thread.

In some embodiments, hole 9 is defined in part by a counterbore or step 11. Step 11 allows a bolt head to sit shy of second side 14.

FIG. 6 illustrates quick release device 100 in plan view of second side 14. Again, conventionally labelled bottom for clarity. Half of a quick release 100 includes elongated body 1 which includes a plurality of holes. Screw 104a and screw 104b are shown fitted in elongated body 1.

FIG. 7 illustrates, in perspective view, a quick release system 200 including quick release device 100a and at least one part of a second quick release device. As shown, a first quick release device 100a sits in an inferior position to a second quick release device 100b. Second quick release device 100b is inverted and coupled with first quick release device 100a. In some embodiments, one of first quick release device 100a or second quick release device 100b is replaced with an elongated body, e.g., elongated body 1.

FIG. 8 illustrates, in perspective view, a kit 300 including quick release device 100 and other parts. In some embodiments, kit 300 includes quick release device 100, an elongated body 1b, a low-profile camera screw (e.g., screw 101a, screw 102a), a threaded adapter 105a, and one or more plurality of anti-twist bodies (e.g., set screw 103, machine screw 104).

In some embodiments, kit 300 includes a first quick release device, and a second quick release device. Low-profile camera screws may be ⅜"-16, e.g., screw 101a, screw 101b, or may be ¼"-20, e.g., screw 102a, screw 102b. In some embodiments, kit 300 includes threaded adaptor 105a and threaded adaptor 105b having a ¼"-20 interior thread and a ⅜"-16 exterior thread. In some embodiments, the plurality of anti-twist bodies includes set screw(s) 103 and machine screw(s) 104. In some embodiments, set screw(s) 103 are 8-32 grub or set screws. In some embodiments, machine screw(s) 104 are M1.6 machine screws with a hex socket cap.

FIG. 1 to FIG. 6 inclusive illustrate elongated body 1, second through hole 19 for ⅜-16 and ¼-20 screws, dowel pin or pin 5, second plurality of inferior holes 21 (e.g., M1.6 threaded), second plurality of inferior holes 22 (e.g., ARRI Anti twist holes), third through hole 10 (e.g., 8-32 threaded hole), dovetail 7, locking channel or detent 15, socket 17 used to mate two elongated bodies, hole or first void 6 in elongated body 1 to receive post 41, hole or second void 16 in elongated body 1 to receive pin 5, spring 30, hole 43 to receive pin 5 in an interference fit, and button face 42.

In additional description device 100 includes a locking channel or detent 15 that pin 5 of a second device mates into when the two devices or halves come together. Detent 15 enables the releasable attachment between two halves along with pin 5 (e.g., M2 by 12 mm dowel). Pin 5 is pressed into hole 43 in button 40 with an interference fit. Pin 5 functions as the locking pin as well as keeping the spring and button assembly in elongated body 1.

In some embodiments, second through hole 19 is a ⅜"-16 tapped or threaded in elongated body 1 of the device 100. In some embodiments, third through hole 10 receives a set screw. For example, is an 8-32 threaded hole which runs parallel and adjacent to second through hole 19 (e.g., the ⅜"-16 threaded hole). A screw, such as a set screw, can be driven into the attached part in order to prevent rotation and as well accidental unscrewing of the attached part. The second plurality of inferior holes 22 may receive ARRI locator pins which keep other accessories from twisting or unscrewing while on the job. These anti-rotation pins lock in accessories like camera handles.

The dovetail 7 and socket 17 are advantageously shaped such that they have corresponding shapes with respect to each other.

The preset disclosure is of systems and devices that are industrially applicable in the film industry and beyond. The quick release locking system is made from suitable materials, such as, but not limited to, metals, plastics, alloys, and the like, and combinations thereof. The choice of material having the required rigidity and flexibility for the application stated herein will become apparent to one skilled in the art. In some specific embodiments, the quick release locking system is made of aluminum. The quick release locking system may further be coated with a suitable material that will impart properties such as durability and low friction. One specific example of such a coating is electroless nickel.

The present disclosure provides a quick release locking system including a quick release device that allows for diverse ways of attaching pieces of equipment to each other, to mounts, and other bodies by the user. The present disclosure also provides a quick release and a quick way to facilitate attachment without regard for male or female parts in respective halves of a quick release. Thus, all accessories equipped with the quick release device described herein can mate with each other which widely expands the use cases of the quick release system in the film industry and beyond.

The quick release system of the present disclosure promotes versatility, unlike the existing cine locks. The quick release system includes two halves that fit together with corresponding dovetail and sockets and lock into place with a spring-loaded pin. Each half provides the ability to receive various threaded and unthreaded connectors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A quick-release device comprising:

an elongated body comprising:

a dovetail sitting proud of a first side of the elongated body, wherein:

the dovetail widens towards a first end of the elongated body, and the dovetail includes a first undercut lip;

a socket defined shy of the first side, wherein:

the socket widens towards a second end of the elongated body, and the socket includes a second undercut lip;

a detent defined in the elongated body and interrupting the second undercut lip proximate to a first edge of the elongated body;

a first void defined in the elongated body from the first edge and underlying the dovetail;

a second void defined in the elongated body interrupting the first undercut lip and in connection with the first void;

a pin in free fit within the second void;

a spring biasing the pin towards the first edge and outside of the uninterrupted periphery of the first undercut lip; and a button in the first void coupled to the spring and to the pin, which in response to an inwardly applied force, moves the pin inside the uninterrupted periphery of the first undercut lip.

2. The quick release device of claim 1, wherein the dovetail and socket are in corresponding shape to each other.

3. The quick release device of claim 1, wherein elongated body further comprises a third void defined from the first side of the elongated body to a second side of the elongated body.

4. The quick release device of claim 3, wherein the third void is threaded.

5. The quick release device of claim 4, wherein the third void is threaded as ⅜"-16 or ¼"-20.

6. The quick release device of claim 1, wherein the elongated body further comprises a fourth void from the first side of the elongated body to a second side of the elongated body.

7. The quick release device of claim 1 further comprising a low friction coating overlying the elongated body.

8. The quick release device of claim 1 further comprising a fourth void defined in the elongated body interrupting a second side and extending toward the first side.

9. A kit comprising a quick release device of claim 1, an elongated body of claim 1, a low-profile camera screw, a threaded adapter, and a least one anti-twist body.

* * * * *